Jan. 19, 1926.
O. W. GREENE
PACKING RING
Filed Jan. 13, 1921
1,569,974
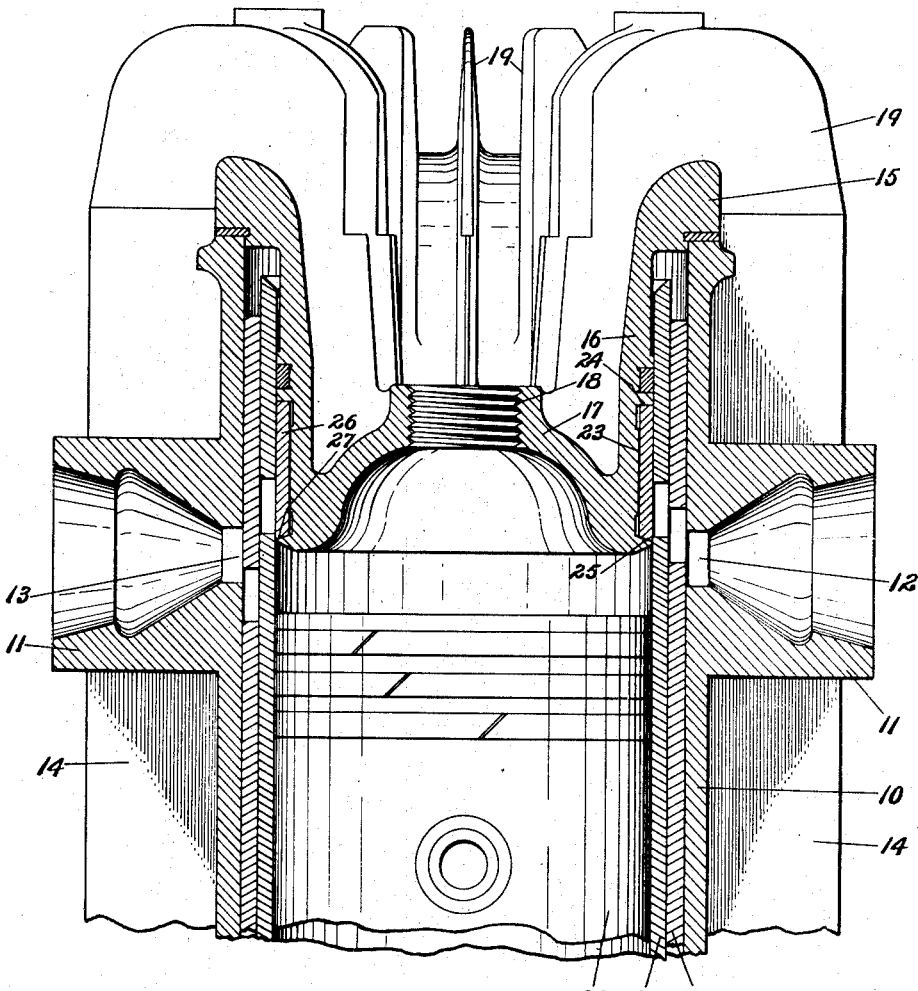
Fig. I.
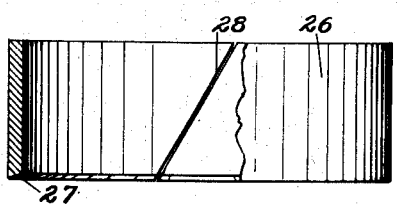
Fig. II.
INVENTOR.
Otto W. Greene.
BY Chester W. Braselton
Harry W. Lindsey
ATTORNEYS.

Patented Jan. 19, 1926.

1,569,974

UNITED STATES PATENT OFFICE.

OTTO W. GREENE, OF ELYRIA, OHIO, ASSIGNOR TO THE WILLYS-OVERLAND COMPANY, OF TOLEDO, OHIO, A CORPORATION OF OHIO.

PACKING RING.

Application filed January 13, 1921. Serial No. 436,985.

*To all whom it may concern:*

Be it known that I, OTTO W. GREENE, a citizen of the United States, residing at Elyria, county of Lorain and State of Ohio, have invented certain new and useful Improvements in Packing Rings, of which I declare the following to be a full, clear, and exact description.

This invention relates to improvements in packing rings and the mounting of the same. It is adapted particularly for use in connection with the junk rings of sliding sleeve valve engines where the cylinder head is made of aluminum alloy or some other metal or alloy having a co-efficient of expansion different from that of steel of which the junk ring is made.

One of the objects of the invention is the provision of a structure by virtue of which a practically gas tight fit is maintained between the edges of the junk ring and the corresponding walls of the ring socket in the head, regardless of the temperature of the engine and the consequent variation in relative dimensions of the socket and ring due to different co-efficients of expansion. In the present instance this object is attained by beveling one edge of the ring and forming the wall in the head engaged thereby with a corresponding bevel. In air cooled Knight engines, the head is commonly made of aluminum alloy which expands more rapidly than does the cast iron junk ring. Consequently, as the engine heats up, the joints between the edges of the junk ring and its socket in the head tend to open. But, the head expands radially at the same time that it expands longitudinally, and this radial expansion causes the beveled wall of the socket to engage the ring a little closer to the center where the socket is narrower. In this manner the tendency towards opening of the joints upon the heating of the engine is compensated for, and also when the engine cools and the head contracts more rapidly than the junk ring, binding of the junk ring in its socket is avoided. It is therefore free to expand and contract at all times in the performance of the ordinary functions of a packing ring of this character, while at the same time tight joints are kept at its edges so as to prevent the leakage of gas through said joints and behind the ring.

Other objects will appear as I proceed with the description of that embodiment of the invention which is illustrated in the accompanying drawing, it being understood that I do not intend to limit myself to this particular use or embodiment of the invention, as I believe the latter to be capable of application to various other purposes.

In the drawing, Figure I is a vertical transverse sectional view of the upper portion of a Knight engine embodying my invention.

Fig. II is a detail elevational view of a junk ring, a portion being broken away to more clearly illustrate the invention.

The cylinder of the engine herein shown is indicated at 10. Enlargements 11 located on opposite sides of the cylinder contain the inlet and exhaust ports 12 and 13 and afford means for connection with the inlet and exhaust pipes (not shown). Longitudinal cooling ribs are indicated at 14.

The cylinder head 15 is of the usual cup shape and has an annular side wall 16 and a central dome 17, the latter being provided with a threaded socket 18 for the reception of a spark plug. The head is also provided with cooling flanges or ribs 19 which preferably align with the ribs 14 of the cylinder. It has been found desirable in air cooled Knight engines to employ for the head a material having the quality of quickly disseminating heat. Certain alloys of aluminum have proven to be satisfactory.

Within the cylinder 10 are slidably arranged the usual valve sleeves 20 and 21 and within the latter is a piston 22. These parts operate in the usual manner and have their customary functions.

The head 15 is provided on the outer side of its annular wall 16 with a junk ring socket having a vertical wall 23, an upper horizontal wall 24, and a lower outwardly and downwardly beveled wall 25. In order to obtain the best results, it is essential that this bevel be cut at the proper angle. With the material which I have employed, the ideal angle has been found to be approximately 18 degrees.

A junk ring 26 provided with a lower edge 27, beveled at the same angle as that of the socket wall 25 fits within the socket. The other edge of the ring is horizontal. The ring is split at 28, and because of its resilience, tends to expand so as to bear closely upon the inner sleeve 21 at all times. A slight clearance between the ring and the wall 23 of the socket exists and hence it would be possible for gas to pass behind the ring unless the joints at the top and bottom are maintained tight, and moreover, if these joints become loose when the engine is hot, carbon collects in them and causes the ring to stick in the socket when the engine cools, thus interfering with the proper functioning of the ring and making the engine difficult to start.

By means of the beveled edges of ring and socket provided in my invention, however, the edge joints are maintained always tight so that the difficulties mentioned are overcome. As the engine heats up, both the ring 26 and the cylinder head expand in a direction parallel to the cylinder axis. The head expands more rapidly, however, thus tending to open the joints at the edges of the ring. But, as a matter of fact, that result does not take place because the cylinder head also expands radially at the same time, thus carrying the inclined wall 25 outward and taking up a little of the clearance between the ring and the socket side wall 23. This causes the bottom edge of the ring to seat on a slightly higher portion of the beveled wall 25 of the socket, thereby taking up the space that would otherwise be left here and providing a snug fit for the ring.

In the drawing the upper edge of the ring 26 and the socket wall 24 are horizontal. It will be understood, however, that the horizontal joint and the beveled joint might be interchanged as to location without departing from the spirit of the invention. Nor, in fact, is the invention limited to the use of a beveled joint at one edge only of the ring. On the contrary, I recognize that under some circumstances it may be desirable to bevel both edges. It will be obvious also, that where the co-efficient of expansion of the ring is greater than that of the cylinder head or other corresponding part, the bevel must be upward instead of downward, as illustrated in the drawing.

While I have shown and described in considerable detail a specific embodiment of my invention, it is to be understood that this showing and description are illustrative only and for the purpose of rendering my invention clearer, and that I do not regard the invention as limited to the details of construction illustrated or described, nor any of them, except in so far as I have included such limitations within the terms of the following claims in which it is my intention to claim all novelty inherent in my invention broadly as well as specifically.

Having thus described my invention, what I claim as new and desire to secure by Letters Patent, is:—

1. In a sliding sleeve valve engine, a cylinder head and a junk ring having different coefficients of expansion, said head and ring having co-operating surfaces so shaped that the radial expansion of the head will compensate for the difference in longitudinal expansion of the head and ring whereby to maintain tight joints between the head and the edges of the ring.

2. In a sliding sleeve valve engine, a cylinder head and a junk ring formed of metallic materials having different coefficients of expansion, said head having a socket for the reception of said ring, one edge of the ring and the corresponding wall of the socket being beveled whereby the variation in relative dimensions due to expansion and contraction will be compensated for and a tight fit maintained.

3. In an engine, a packing ring, a cylindrical element having a socket for the reception of said ring, said cylindrical element and ring being formed of metallic materials having different coefficients of expansion, one edge of the ring and the corresponding wall of the socket being beveled, whereby the variation in relative dimensions due to expansion and contraction will be compensated for and a tight fit maintained.

4. In a sliding sleeve valve engine, a cylinder head having therein a ring socket wider at its mouth than at its base, a junk ring fitting said socket so as to leave a slight clearance at the base thereof when the parts are cool, said head having a greater coefficient of expansion than said ring, whereby as the parts heat up the radial expansion of the head will compensate for the difference in longitudinal expansion of the head and ring.

5. In combination, two metallic elements having juxtaposed faces relatively slidable, one of said elements being fixed and having a socket therein, a metallic packing strip mounted in said socket, said last named element and said packing strip having different coefficients of expansions, one edge of said strip and the corresponding wall of the socket being beveled.

6. In combination, two metallic elements, one of which is fixed and provided with a socket and the other slidable thereon, a metallic packing strip mounted within the socket, said elements being relatively slidable in a direction transversely of the packing strip, said socketed element and said strip having different coefficients of expansion, one edge of the strip and the corresponding wall of the socket being beveled.

In testimony whereof, I affix my signature.

OTTO W. GREENE.